United States Patent Office 3,579,547
Patented May 18, 1971

3,579,547
CARBOXYLIC ACID ESTERS
James T. Traxler, Evanston, Ill., assignor to SCM
Corporation, New York, N.Y.
No Drawing. Filed Dec. 16, 1966, Ser. No. 602,166
Int. Cl. C11c *3/04*
U.S. Cl. 260—410.6                          15 Claims

ABSTRACT OF THE DISCLOSURE

Novel internal carboxylic acid esters of linear aliphatic polyatomic alcohols have been prepared. The polyatomic alcohols comprising the alcohol portion of the esters contain from 4 to 12 carbon atoms and the carboxylic acid portion of the esters contain from 2 to 26 carbon atoms. Preferred esters are carboxylic acid esters of mannitol and sorbitol and are useful as emulsifying agents. Particularly preferred esters are the mono- and di-stearoyl and palmitoyl esters of sorbitol and mannitol. The novel esters are prepared by reacting a carboxylic acid or a lower alkyl ester of a carboxylic acid with an ketalized linear aliphatic polyatomic alcohol in the presence of an alkaline catalyst to form a carboxylic acid ester of the ketalized alcohol and thereafter hydrolyzing the ketal of the ester to form hydroxyl groups at the terminal carbon atom. The hydrolysis is preferably accomplished by acid.

---

The present invention relates to carboxylic acid esters of polyatomic alcohols. The invention, more particularly, relates to a novel class of internal esters of polyatomic alcohols and to novel processes for preparing such esters. The internal esters are useful in that they have surface active properties. The invention is particularly advantageous in that it can, by selection by reactants, provide novel compounds which are good food emulsification agents and which can also easily be made free of toxic by-products or residue which are found in similar esters prepared by prior art processes.

The invention provides a novel class of compounds comprising internal carboxylic acid esters of linear aliphatic polyatomic alcohols wherein the carboxylic acid has an acid strength insufficient to hydrolyze the ketal groups of a ketalized linear aliphatic polyatomic alcohol.

The term "interior carboxylic acid esters" as used herein is intended to mean and to refer to carboxylic acid ester groups attached to carbon atoms on a position other than the alpha and omega positions in a linear carbon atom chain of a polyatomic alcohol.

The term "linear aliphatic polyatomic alcohol" as used herein is intended to mean and to refer to linear aliphatic polyhydric alcohols containing 4 or more carbon atoms wherein a hydroxyl group is attached to each carbon atom in the linear carbon atom chain of the alcohol.

The polyatomic alcohols from which the carboxylic acid esters of this invention are prepared are polyatomic alcohols containing 4 or more carbon atoms, preferably between 5 and 12 carbon atoms. The alcohols have the empirical formula $C_nH_{(n+2)}(OH)_n$ where $n$ is an integer of 4 or greater, preferably from 4 to 12. Examples of such polyatomic alcohols are the tetritols (e.g. erythritol) which comprise the isomers of linear aliphatic polyatomic alcohols containing 4 carbon atoms and 4 hydroxyl groups; the pentitols (e.g. arabitol) which are the isomers of polyatomic alcohols containing 5 carbon atoms and 5 hydroxyl groups; the hexitols (e.g. mannitol and sorbitol) which are isomers of polyatomic alcohols containing 6 carbon atoms and 6 hydroxyl groups; the heptitols (e.g. perseite) which are polyatomic alcohols containing 7 carbon atoms and 7 hydroxyl groups, etc. Although carboxylic acid esters of alcohols containing more than 12 carbon atoms and 12 hydroxyl groups fall within the novel class of compounds comprising this invention, such alcohols are difficult to obtain.

Preferred carboxylic acid esters of this invention are esters formed from polyatomic alcohols selected from the class consisting of the pentitols and hexitols, a preferred pentitol being arabitol and preferred hexitols being mannitol and/or sorbitol. Carboxylic acid esters of such alcohols have been found to be particularly advantageous emulsifiers.

The carboxylic acid esters of this invention are prepared from carboxylic acids containing from 2 to 26 carbon atoms and having a pK above about 4.2. As will be hereinafter evident, if the pK is below about 4.2 it is usually not possible to obtain the esters of this invention. Carboxylic acids having a pK above about 4.2 include, for example, monocarboxylic acids, certain substituted monocarboxylic acids and polycarboxylic acids. Examples of such monocarboxylic acids include, for example, acids of the empirical formula $C_nH_{(2n+1)}$ COOH and include acetic, propionic, butyric, valeric, caproic, enanthylic, caprylic, pelargonic, capric, undecyclic, lauric, tridecoic, myristic, pentadecanoic, palmitic, margaric, stearic, nondecylic, arachidic, behenic, carbnaubic, hyenic, carboceric, and cerotic acids. Examples of substituted monocarboxylic acids include ricinoleic acid, nicotinic acid, crotonic acid, cyanuric acid, glutaric acid, 2-naphthoic acid, succinic acid, vanillic acid, and the like.

Specific advantageous internal carboxylic acid esters of polyatomic alcohols falling within the scope of this invention include carboxylic acid esters of the tetritols wherein the ester group is positioned on the No. 2 carbon atom. Examples of such esters are erythritol-2-acetate, erythritol-2-propionate, erythritol-2-butyrate, erythritol-2-stearate, erythritol-2-palmitate, etc.; esters of the pentitols wherein the ester group is positioned on the No. 3 carbon atoms such as, for example, arabitol-3-acetate, arabitol-3-propionate, arabitol-3-butyrate, arabitol-3-behenate, arabitol-3-laurate, arabitol-3-stearate, arabitol - 3 - palmitate, etc.; mono-esters and di-esters of the hexitols, for example, sorbitol-3-acetate, sorbitol-3-propionate, sorbitol-3-butyrate, sorbitol-3-stearate, sorbitol-3-behenate, sorbitol-3-palmitate, sorbitol-3-oleate, etc.; sorbitol-3,4-diacetate, sorbitol-3,4-dipropionate, sorbitol-3,4-distearate, sorbitol-3,4-dipalmitate, sorbitol-3,4-dioleate, etc.; sorbitol-3-ricinoleate, sorbitol-3,4-ricinoleate, and the like.

Where the carboxylic acid esters are esters of polyatomic alcohols containing 7 or more carbon atoms, mono-esters, di-esters, tri-esters, tetra-esters, penta-esters, etc., may be prepared. In substantially all instances the compounds of this invention are characterized in having hydroxyl groups attached to both terminal carbon atoms of the linear carbon atom chain.

Such compounds, because of the latitude in their lipophilic and hydrophilic components and functionality, are broadly useful as a class of surface active agents. Those of the class which are long chain fatty acid esters are especially useful as emulsifying and film-forming agents in shortening compositions, cakes and prepared cake mixes, pie pastries, pie mixes and crusts, cake doughnut products and prepared mixes therefor; and cake and waffle products and prepared mixes therefor, cookie, biscuit and cracker doughs which are yeast and non-yeast leavened; puffed pastry and prepared mixes therefor; and margarin, icings, fillings, fondants and prepared mixes therefor; dairy and filled milk products and replacement therefor wherein the protein or fat is derived from non-milk sources (e.g. wet and spray-dried whipped toppings, coffee whiteners, etc.). Other uses for the compounds of this invention are as emulsifiers in sulphurizing flour, dehydrated potatoes, puddings, such as gelatin, cornstarch, renet and tapiocca puddings, etc.; pre-cooked rice, fruit and vegetable purees, dehydrated fruits and vegetables; macaroni, spaghetti, vermicelli and noodles; peanut butters, dietetic drinks, salid dressings, chocolate and confectioner's coatings; pharmaceutical preparations, soaps, lotions, shaving creams; cosmetic preparations such as depilatory preparations, lipsticks, and hand creams; and aerosol packed products, soda fountain syrups and food coatings. Generally, the esters are useful in oil-water emulsion systems.

The novel compounds of this invention are prepared by a process which comprises the steps of (1) reacting a compound selected from the group consisting of carboxylic acids and lower alkyl esters thereof with the internal hydroxyl groups of the ketalized linear aliphatic polyatomic alcohol in the presence of a catalyst thereby forming a carboxylic acid ester of said ketalized alcohol, said carboxylic acids having an acid strength insufficient to hydrolyze the ketal of said ketalized alcohol, and (2) hydrolyzing the ketal of the internal carboxylic acid ester to form terminal hydroxyl groups.

By so proceeding, an internal carboxylic acid ester of a linear polyatomic alcohol is formed wherein the acyl groups are internally positioned, that is, they are not positioned on the alpha and/or omega carbon atoms.

Generally, polyatomic alcohols tend to form anhydro compounds during esterification reactions. The formation of anhydro compounds occurs through dehydration in which the hydrogen and oxygen of one hydroxyl group and the hydrogen of another hydroxyl group form water and the remaining free oxygen valence bond attaches to the carbon atom vacated by the hydroxyl group. By way of example, sorbitan esters of carboxylic acids are well-known and can be easily prepared. However, such compounds have certain disadvantages, particularly when employed in conjunction with coating fats to coat food and/or confectionery products. Compounds such as sorbitan-stearate, sorbitan-laurate or sorbitan-oleate, while they have emulsification properties, do not have film-forming properties and are generally unsuitable for use in conjunction with coatings fats to form food coatings.

Although sorbitol esters of carboxylic acids have been previously prepared, the acyl groups of the esters are positioned either randomly on all carbon atoms or preferentially on the terminal carbon atoms. Prior to the present invention the only known way of producing such sorbitol esters without the formation of anhydro compounds has been to employ highly toxic liquid solvents such as dimethyl formamide and dimethyl sulfoxide. Residual quantities of such liquids and decomposition products thereof remain in the sorbitol esters rendering them unsuitable for use in food applications.

Surprisingly, ketalized polyatomic alcohols can be readily internally esterified without the use of toxic liquids and the final products are suitable for use as emulsification agents in food applications.

The ketalized linear aliphatic polyatomic alcohols employed in the processes of this invention are readily obtained by reacting any of the hereinbefore described polyatomic alcohols with a ketone, preferably a lower aliphatic ketone. Any of a wide variety of substituted and unsubstituted ketones may be employed in the preparation of the ketalized alcohols including, for example, acetone, butanone, 3-pentanone, 2-pentanone, 3-hexanone, 2-hexanone, acetophenone, propionphenone, butyrophanone, 1-phenyl-2-propanone, etc. Of these lower aliphatic ketones, particularly acetone and butanone, are preferred.

The formation of the ketalized alcohol is carried out by conventional means such as, for example, reacting the ketone with a polyatomic alcohol in the presence of an acid catalyst, usually a mineral acid catalyst such as hydrochloric acid. By so proceeding, a ketalized polyatomic alcohol is formed in which the ketal group is located at the 1,2, carbon atom positions or on the distal pairs of carbon atoms in the case where the ketalized polyatomic alcohol is a di-ketal. The ketal group or groups of the ketalized polyatomic alcohol prevent esterification reactions between the terminal carbon atom groups, thus, directing the esterification of the internal hydroxyl group or groups of the ketalized polyatomic alcohol.

The ketalization of pollatomic alcohols is readily effected by suspending or dispersing the polyatomic alcohol in the ketone in the presence of an acid catalyst at a temperature between about 25 and 30° C. until the desired ketal is formed and then quenching the reaction after the formation of the desired ketal by neutralizing the acid with an alkaline material. Examples of acid catalysts which may be employed include the strong form of various cation exchange resins and mineral and organic acids such as, for example, sulphuric, hydrochloric and phosphoric acids; oxalic, citric an dtartaric acids. Where a solid acid catalyst such as, for example, the acid form of a strong cation exchange resin is employed the reaction between the polyatomic alcohol and the ketone is quenched by removing the solid catalyst from the reaction mixture.

The concentration of acid employed and the reaction time used will depend upon a number of factors including the extent of ketalization of the alcohol desired. Thus, for example, when it is desired to ketalize erythritol, the reaction will be stopped after the mono-ketal is formed. When it is desired to prepare, for example, the di-ketal of arabitol, sorbitol or mannitol, the reaction will be stopped when the di-ketal is formed. Failure to neutralize, inactivate or remove the acid catalyst will usually result in further ketalization. Determination of the quenching time of the reaction can be readily ascertained by sampling a portion of the reaction mixture and analyzing it for hydroxyl number and/or by thin layer chromatographic analysis.

A wide variety of alkaline materials can be employed to quench the ketalization reaction including, for example, alkali metal and alkaline earth metal hydroxides and carbonates. Of these, alkali metal hydroxides and carbonates are preferred. As will be evident to those skilled in the art, any desired degree of ketalization can be obtained by regulating the quenching time. Thus, for example, the mono- and di-ketals of pentitols, hexitols, heptitols, etc. can be reaidly prepared and the ketal groups will be formed at the terminal ends of the carbon atoms chain of the polyatimic alcohol. In the case of the heptitols, it may sometimes be desirable to form the tri-ketal, particularly when it is desired to form a carboxylic acid mono-ester of the heptitol.

As noted hereinbefore, the internal carboxylic acid esters of polyatomic alcohols can be prepared by reacting a carboxylic acid or a lower alkyl ester of a carboxylic acid with the ketalized polyatomic alcohol. The carboxylic acids employed are those described hereinbefore and the corresponding lower alkyl esters of these carboxylic acids, for example, the methyl and/or glycerol esters (e.g. methyl or glycerol acetate, methyl or glycerol propionate, methyl or glycerol oleate, etc.).

The reaction between the carboxylic acid or ester thereof and the ketalized polyatomic alcohol is carried out in the presence of an alkaline catalyst. A wide variety of alkaline catalysts can be employed including, for example, alkali metal or alkaline earth metal, hydroxides or carbonates and alkaline alkali metal or alkaline earth metal salts. Examples of such alkaline catalysts include sodium or potassium hydroxide, sodium or potassium carbonate, calcium or aluminum hydroxide or carbonates, and alkali metal salts of any of the fatty acids hereinbefore described. Of these catalysts, alkali metal hydroxides or alkali metal salts of fatty acids are particularly preferred for reasons which will be evident from the specific examples.

The ratio of reactant (e.g. carboxylic acid or lower alkyl ester thereof) and ketalized polyatomic alcohol may vary widely depending upon the ester desired, for example, if a monoester of sorbitol stearate is desired, one molecular proportion of ketalized sorbitol is reacted with one molecular proportion of the carboxylic acid or alkyl ester thereof. If a di-ester of sorbitol is desired, 2 molecular proportions of the carboxylic acid or lower alkyl ester thereof will be reacted with a molecular proportion of the ketalized sorbitol.

Acylation of the ketalized alcohol is preferably accomplished by heating the ketalized polyatomic alcohol with the fatty acid in the presence of an alkali metal salt of the fatty acid at a temperature between about 100 and 185° C. under liquid phase conditions. Such acylation or esterification occurs readily and substantially without the formation of anhydro compounds to form the carboxylic acid ester of the ketalized polyatomic alcohol.

The carboxylic acid ester of the ketalized polyatomic alcohol, when formed, can be readily converted to the carboxylic acid ester of the polyatomic alcohol by hydrolyzing the ketal group or groups on the ketalized alcohol. Hydrolysis can be readily accomplished by an acidic catalyst such as a boron halide or a mineral acid. Of these catlysts, mineral acids are preferred for economic reasons.

As will hereinafter be evident from the specific examples, the ketal groups of the carboxylic acid ester of the ketalized polyatomic alcohol are hydrolyzed to form the carboxylic acid ester of the polyatomic alcohol by dissolving the ketalized ester in a suitable solvent, preferably a water immiscible organic solvent, and dispersing, with agitation, an aqueous mineral acid in the solvent. The reaction is preferably conducted at room temperature using an acid of sufficient strength to hydrolyze the ketal groups and to form hydroxyl groups. Mineral acids such as hydrochloric, sulphuric and phosphoric are preferred, and hydrochloric acid is particularly preferred. Hydrolysis is accomplished by agitating the solvent with the aqueous acid to form a double phase system during which time the aqueous acid is in intimate contact with the carboxylic acid ester in the solvent and the ketal groups are removed therefrom.

The following specific examples are intended to illustrate the invention, but not to limit the scope thereof, parts and percentages being by weight unless otherwise specified.

EXAMPLE 1

The preparation of di-ketalized polyatomic alcohol (a) THE PREPARATION OF SORBITOL DI-ISOPROPYLIDINE AND SORBITOL MONO-ISOPROPYLIDINE To a reaction vessel equipped with a magnetic stirrer there was added 50 ml. of acetone, 9.2 grams (0.05 mole) of sorbitol and 4 drops (0.14 ml. —$2 \times 10^{-3}$ mole) of concentrated HCl. The resultant mixture was turbid but, upon stirring for 120 minutes at room temperature, it became completely clear. Thereafter, there was added 10 grams of anhydrous potassium carbonate to neutralize the acid in the solution, to remove the water of reaction formed therein and to prevent further reaction between the acetone and the sorbitol. Acetone was removed from the solution by heating it to 100° C. over a steam bath.

The residual non-volatile material was a viscous colorless liquid. This liquid was dissolved in 5 ml. of a 1:3 mixture of ethyl ether and ligroin (a low boiling hydrocarbon solvent) and passed through a 50 gram, 1 × 33 centimeter silica gel column. The first chromatographic fraction, upon elution, contained the tri-isopropylidine derivative of sorbitol. The second eluent fraction, constituting 57.4 percent of the original material, consisted substantially of sorbitol di-isopropylidine and the third eluent fraction, which consisted of 25.7 percent of the original material, consisted of a mixture of sorbitol di-isopropylidine and sorbitol mono-isopropylidine. The third eluent fraction was further chromatographed and 6.3 percent, basis the starting material, of sorbitol di-isopropylidine was recovered. A total of 8.38 grams of substantially pure sorbitol di-isopropylidine were obtained.

In the foregoing synthesis, anhydrous potassium carbonate is employed to remove water of reaction and to neutralize the hydrochloric acid, thus, destroying the catalytic activity and quenching the reaction between acetone and the polyatomic alcohol. Failure to completely neutrailize the acid will result in formation of sorbitol tri-isopropylidine. If smaller quantities of acid are used and shorter reaction times are employed, the resultant product will consist of a mixture of sorbitol mono-isopropylidine and sorbitol di-isoprpylidine. In each instance, the sorbitol mono-isopropylidine and sorbitol di-isopropylidine can be recovered by chromatographic separation and can be used as the ketalized alcohol in the process of this invention. In the above reaction, methyl ethyl ketone and methyl isobutyl ketone can be employed in place of the acetone to form the corresponding ketalized polyatomic alcohols.

(b) THE PREPARATION OF ERYTHRITOL MONO-ISOPROPYLIDINE

To a reaction vessel similar to that employed in (a) above, there is added 50 ml. of acetone, 6.04 grams (0.05 mole) of erythritol and 4 drops (0.14 ml.—$2 \times 10^{-3}$ mole) of concentrated hydrochloric acid. Thereafter, 0.6 gram of anhydrous potassium hydroxide is added to neutralize the acid in the solution, to remove the water of the reaction formed therein and to prevent further reaction between the acetone and the erythritol. The product obtained consists of a small amount of unreacted erythritol, a predominant amount of erythritol mono-isopropylidine and a minor amount of erythritol di-isopropylidine. The erythritol mono-isopropylidine is recovered by chromatographic separation and elution.

In the foregoing syntheses, optimum reaction times can be determined by sampling the reaction mixture at 5 or 10 minute intervals and analyzing the contents by thin layer chromatographic analysis. It is, thus, possible to arrive at quenching times and to prevent the formation of fully ketalized polyatomic alcohols which are not susceptible to acylation.

(c) THE PREPARATION OF ARABITOL DI-ISOPROPYLIDINE AND MONO-ISOPROPYLIDINE

The procedure of Example 1(a) is repeated except that 7.61 grams (0.05 mole) of arabitol is employed in place of the sorbitol employed in (a). The product obtained is a mixture of arabitol mono-isopropylidine and arabitol di-isopropylidine which are dissolved, chromatographed, eluted, separated and recovered as in (a) above.

EXAMPLE 2

The preparation of sorbitol mon-stearate

To 0.05 mole of sorbitol di-isopropylidine prepared as in Example 1(a), there was added 1.2 grams ($4 \times 10^{-3}$ mole) of sodium stearate and 13.2 grams (0.046 mole) of stearic acid. The mixture was heated at 175° C. with nitrogen stirring and entrainment for 7½ hours. Thereafter, the reaction mixture was dissolved in 200 ml. of ether to which there was added sufficient potassium carbonate to render the reaction mixture alkaline to phenolphthalien and to remove unreacted fatty acid. The solution was filtered and permitted to stand at room temperature for 12 hours. A portion of the filtrate was analyzed by thin layer chromatography and found to consist of a solution of sorbitol di-isopropylidine-3-stearate.

To the filtrate there was added 12 ml. of a 1:1 acqueous solution of HCl (to hydrolyze the ketal groups) and the mixture was stirred at room temperature for 3.5 hours during which time a precipitate appeared. The resulting precipitate was separated by filtration, washed with water and dried to constant weight in a calcium sulphase dessicator. The product obtained from the washed precipitate consisted of 5.81 grams of a white solid which upon thin layer chromatographic analysis was shown to consist substantially of sorbitol-3-mono-stearate. The filtrate, after removal of the water layer, was evaporated and 8.42 grams of a white product was obtained. Thin layer chromatographic analysis showed this product to consist of a mixture of sorbitol-3-mono-stearate and sorbitol di-isopropylidine-3-mono-stearate. The material was suspended in 100 ml. of ethyl ether to which there was added 6 milliliters of hydrochloric acid to hydrolyze the iso-propylidine groups of the di-isopropylidine-3-mono-stearate. A precipitate formed in this liquid was filtered as abovedescribed and an additional 2.7 grams of sorbitol mono-stearate were obtained.

Arabitol-3-mono-stearate is suitably prepared by substituting arabitol for sorbitol in Example 2.

Sorbitol-3,4-di-stearate containing stearoyl groups is suitably prepared by doubling the respective amounts of sodium stearate and stearic acid in the procedure employed in Example 2.

EXAMPLE 3

The preparation of erythritol mono-stearate

To 0.05 mole of the erythritol isopropylidine there is added 1.2 grams ($4 \times 10^{-3}$ mole) of sodium stearate and 13.2 grams (0.046 mole) of stearic acid. The mixture is heated to 175° C. with nitrogen stirring and entrainment for 9 hours. Thereafter, the reaction mixture is dissolved in 200 milliliters of ether to which excess potassium carbonate is added to render the reaction mixture alkaline to phenolphthalein to remove unreacted fatty acid. The solution is filtered and the filtrate is permitted to stand at room temperature for 12 hours. The filtrate contains mixed erythritol isopropylidine stearates. To the filtrate there is then added 12 ml. of a 1:1 aqueous solution of HCl and the mixture is stirred at room temperature for 4 hours. A precipitate forms which is separated by filtration, washed with water, and dried to constant weight in a calcium sulphate dessicator. The product obtained is a mixture of erythritol isopropylidine-2-mono-stearate and erythritol-1-mono-stearate and erythritol-1,2-di-stearate. The products can be chromatographically separated into their substantially pure forms.

EXAMPLE 4

The preparation of sorbitol-3-mono-laurate

To 0.05 mole of sorbitol di-isopropylidine prepared as in Example 1(a) there was added $4 \times 10^{-3}$ mole of sodium laurate and 0.046 mole of lauric acid. The mixture was heated to 175° C. with nitrogen stirring and entrainment for 6.5 hours. Thereafter, the reaction mixture was dissolved in 100 ml. of ether to which there was added sufficient potassium carbonate to render the reaction mixture alkaline to phenolphthalein to remove unreacted fatty acid. The solution was filtered and permitted to stand at room temperature for 12 hours. A portion of the filtrate was analyzed by thin layer chromatography and found to consist of a solution of sorbitol di-isopropylidine-3-mono-laurate.

To the remainder of the filtrate there was added 6 milliliters of a 1:1 aqueous solution of HCl (to hydrolyze the ketal groups) and the mixture was stirred at room temperature for 3 hours during which time a precipitate appeared. The resulting precipitate was separated by filtration, washed with water, and dried to constant weight in a calcium sulphate dessicator. Six and twenty-one hundredths (6.21) grams of a dried product, which upon chromatographic analysis was shown to consist substantially of sorbitol-3-mono-laurate, was obtained.

Arabitol mono-laurate is suitably prepared by substituting 0.05 mole of arabitol di-isopropylidine for the sorbitol di-isopropylidine employed in the process of Example 4.

EXAMPLE 5

The preparation of sorbitol-3-oleate

To 0.05 mole of sorbitol di-isoproplidine prepared as in Example 1(a) and 50 ml. of benzene, there was added 15.0 grams (0.05 mole) of methyl oleate. Five (5) ml. of the benzene were distilled to insure dryness in the product and 0.2 gram ($4 \times 10^{-3}$ mole) of sodium methoxide was added. The solution was agitated under reflux distillation conditions and samples of the reaction mixture were periodically removed and subjected to thin layer chromatographic analysis. At the end of 12.5 hours, 0.2 gram of additional sodium methoxide was added to the reaction mixture. At the end of 20.5 hours, thin layer chromatographic analysis indicated that substantial quantities of the methyl oleate had been consumed. The benzene was evaporated and the residue was added to 200 ml. of ether to which had been added excess potassium carbonate to render the mixture alkaline to phenolphthalein and to remove residual water. The mixture was allowed to stand for 12 hours. Thin layer chromatographic analysis indicated that the solution contained substantial quantities of sorbitol di-isopropylidine-3-mono-oleate. The mixture was then filtered and 12 milliliters of a 1:1 aqueous solution of the HCl was added to the filtrate and the mixture was stirred at room temperature for 3 hours. Thereafter, the aqueous layer was removed by decantation and the ether layer was clarified by filtration at 0.° C. A product consisting substantially of 3.34 grams of sorbitol-3-mono-oleate was obtained.

Arabitol-3-mono-oleate is prepared by substituting 0.5 mole of arabitol di-isopropylidine for the sorbitol di-isopropylidine employed in Example 5 using the procedure employed in that example.

EXAMPLE 6

The preparation of sorbitol-3-mono-behenate

To 0.05 mole of sorbitol di-isopropylidine there was added 0.16 gram ($4 \times 10^{-3}$ mole) of sodium hydroxide and 1.4 grams of behenic acid. Thereafter, an additional 15.6 grams of behenic acid (to provide a total of 0.05 mole) was added and the solution was heated to 175° C. with nitrogen stirring and entrainment. After 9.5 hours, the reaction solution was dissolved in 200 ml. of ether to which excess potassium carbonate was added to render the mixture alkaline to phenolphthalein and to remove excess behenic acid and the mixture was allowed to stand overnight. After filtration, 12 ml. of a 1:1 aqueous solution of HCl was added to the filtrate and the resulting mixture was stirred for 3.5 hours during which time a precipitate appeared. The precipitate was separated from the mixture by filtration and dried to constant weight in a dessicator. A total of 6.33 grams of a dried product, which was shown to consist preponderantly of sorbitol-3-behenate, was obtained.

Sorbitol-3,4-behenate is prepared by doubling the amounts of sodium hydroxide and behenic acid using the above procedure.

Arabitol-3-behenate is prepared by substituting 0.05 mole of arabitol di-isopropylidine for the sorbitol di-isopropylidine using the procedure employed in the foregoing Example 6.

EXAMPLE 7

The preparation of sorbitol-3-mono-stearate using lycerolyzed tri-stearin as solvent Twenty (20) grams of sorbitol di-isopropylidine-3-mono-stearate was prepared according to the procedure of the first paragraph of Example 4 and was melted by heating to 80° C. Twelve (12) grams of a glycerolyzed tri-stearin (e.g. a product prepared by reacting glycerol and tri-stearin in the presence of a rearrangement catalyst such as sodium methoxide) to form a solution comprising a sorbitol di-isopropylidine-3-mono-stearate in the glycerolyzed stearin. To this solution there was added 25 ml. of distilled water which had been heated to 90° C. and 10 ml. of a 10:1 aqueous solution of HCl which was also at 90° C. The mixture was stirred vigorously at between 79–81° C. for ½ hour and thereafter cooled to 60° C. with gentle agitation. The aqueous layer was removed by decantation and the residue was mixed with 50 ml. of hot water. The resultant mixture was heated to 80° C. with vigorous stirring, cooled and the water layer was again removed by decantation. The resultant product consisted of 26.20 grams of light brown amorphous solid material and contained 30 percent (by thin layer chromatographic analysis) of sorbitol-3-mono-stearate. The product ws an excellent emulsifier.

In the foregoing Example 7, the glycerolyzed tristearin was the solvent vehicle in the hydrolysis of the ketalized ester to the alcohol ester and replaced the ethyl ether employed in prior examples.

EXAMPLE 8

The preparation of sorbitol stearate in triglycerides by alcoholysis

Ninety-one (91) grams (0.5 mole) of sorbitol were suspended in 500 ml. acetone. To the suspension there was 1.3 ml. concentrated HCl and the mixture was stirred at room temperature for 2 hours after which time the suspension had become clear indicating that the sorbitol had been converted to the acetone soluble ketal (i.e. sorbitol di-isopropylidine). Sodium hydroxide (1.1 gram—2.75 $\times 10^{-2}$ mole) was added to the solution to neutralize the acid (thereby quenching further reaction between the sorbitol and the acetone) and the solution was stirred at room temperature for 30 minutes. A reaction product consisting of crude sorbitol di-isopropylidine dissolved in acetone, and which also contained small quantities of water, sodium chloride, sodium hydroxide, sorbitol mono-isopropylidine and sorbitol tri-isopropylidine, was obtained.

The acetone and water were removed from the reaction product by distillation under partial vacuum (i.e. an aspirator) at a temperature of about 100° C. and 147 grams (0.167 mole) of soybean stearine a( hydrogenated soybean oil in which the fatty acid ester content consisted of approximately 90 percent stearate and 10 percent palmitate) were added and mixed with the hot (100° C.) crude sorbitol di-isopropylidine. The mixture which consisted of sorbitol di-isopropylidine dissolved in soybean stearine and was heated at 180° C. with mechanical stirring for 4 hours after which time it was permitted to cool to room temperature over a 12 hour period. During the cooling two layers formed; a white solid upper layer which consisted preponderantly of the fatty acid mono-ester of sorbitol di-isopropylidine (e.g. sorbitol di-isopropylidine-3-mono-stearate) and a dark viscous lower layer consisted preponderantly of glycerine. The two layers were heated to 60° C. to melt the white layer and the melted liquid was separated from the viscous lower layer by decantation. One hundred (100) grams of a laurate hard butter (a product sold commercially under the trademark of PARAMOUNT B) were added to the decanted white product while it was maintained in a liquid state at a temperature of 60° C. To this mixture, with agitation, there was added 100 ml. of a 3 percent aqueous solution of hydrochloric acid which had been pre-heated to 60° C. There was thus formed a two-phase aqueous and fatty mixture which was stirred for 30 minutes while the temperature was maintained at between 65 and 75° C. Thereafter, a 50 ml. quantity of warm water (60° C.) was added while gentle agitation was continued. During this period two layers, a water layer and an oily layer, formed and separated and the water was removed by decantation. The resulting oily layer was a product which consisted preponderantly of the fatty acid mono-ester of sorbitol, the ketal (i.e. isopropylidine) groups having been removed from the sorbitol by acid hydrolysis in the laurate hard butter. The product was then washed with warm (60° C.) water using 5 separate 100 ml. increments of warm water during which the stirring and decantation of the water was repeated. The washed product was dried by heating it to a temperature of 100° C. at aspirator pressure. A yield of 268.3 grams of a product which contained about 80 grams of sorbitol ester was obtained. The product was analyzed by column chromatography and found to disperse into 4 fractions in the silica chromatographic column. The first fraction, which accounted for 49.8 percent of the product, consisted predominantly of hard butter triglycerides and contained minor amounts of free fatty acid. The second fraction, which accounted for 12 percent of the product, contained preponderant amounts of diglycerides and small amounts of free fatty acids. The third fraction, which accounted for 14 percent of the original product, consisted substantially of mono-glycerides and trace amounts of sorbitol esters. The fourth fraction, which accounted for 24.2 percent of the product, consisted predominantly of the mono fatty acid ester of sorbitol and minor amounts of fatty acid di- and tri-ester of sorbitol.

The procedure of Example 8 was repeated except that hydrogenated cottonseed oil was employed in place of the laurate hard butter employed in that example. Four similar chromatographic fractions were obtained. The product of Example 8, containing a mixture of the four fractions above-described, is an excellent emulsifier and is particularly useful in enhancing and maintaining the surface gloss in confectionary products.

What is claimed is:

1. The process for preparing an internal carboxylic acid ester of a linear aliphatic polyatomic alcohol, said alcohol having the formula $C_nH_{(n+2)}(OH)_n$ where $n$ is an integer of from 5 to 12, and wherein the carboxylic acid ester groups are attached to carbon atoms on a position other than the alpha and omega positions in said polyatomic alcohol which comprises the steps of:
    (A) reacting said polyatomic alcohol with a lower aliphatic ketone, thereby forming a ketalized linear aliphatic polyatomic alcohol;
    (B) reacting a compound selected from the group consisting of carboxylic acids having a pK above 4.2 and lower alkyl esters thereof with the internal hydroxy groups of said ketalized linear aliphatic polyatomic alcohol in the presence of a catalyst thereby forming a carboxylic acid ester of said ketalized alcohol; and
    (c) hydrolyzing the ketal groups of said ketalized carboxylic acid ester to form terminal hydroxyl groups.

2. The process of claim 1 wherein the hydrolysis is carried out in a solvent for said ketalized carboxylic acid.

3. The process of claim 1 wherein the ketal of said ketalized carboxylic acid ester is hydrolyzed with acid.

4. The process of claim 1 wherein the ketalized polyatomic alcohol contains at least 5 carbon atoms and has 2 ketal groups.

5. The process of claim 1 wherein the ketalized polyatomic alcohol is sorbitol di-isopropylidine.

6. The product prepared by the process of claim 1.

7. The product prepared by the process of claim 1 wherein a lower aliphatic ketone is reacted with a polyatomic alcohol selected from the group consisting of pentitols and hexitols.

8. The product prepared by the process of claim 1 wherein a lower aliphatic ketone is reacted with sorbitol.

9. The product prepared by the process of claim 1 wherein a ketalized linear aliphatic polyatomic alcohol is reacted with a monocarboxylic acid.

10. The product prepared by the process of claim 1 wherein a ketalized linear aliphatic polyatomic alcohol is reacted with an aliphatic fatty containing between 2 and 26 carbon atoms.

11. The product prepared by the process of claim 1 wherein:
    (a) a lower aliphatic ketone is reacted with sorbitol; and
    (b) the ketalized linear aliphatic polyatomic alcohol formed is reacted with an aliphatic fatty acid containing between 2 and 26 carbon atoms.

12. The product prepared by the process of claim 1 wherein:
   (a) a lower aliphatic ketone is reacted with sorbitol; and
   (b) the ketalized linear aliphatic polyatomic alcohol formed is reacted with palmitic acid.

13. The product prepared by the process of claim 1 wherein:
   (a) a lower aliphatic ketone is reacted with sorbitol; and
   (b) the ketalized linear aliphatic polyatomic alcohol formed is reacted with stearic acid.

14. The product prepared by the process of claim 1 wherein the compound formed is a mono-ester.

15. The product prepared by the process of claim 1 wherein the compound formed is a di-ester.

References Cited

UNITED STATES PATENTS

| | | | |
|---|---|---|---|
| 2,031,603 | 2/1936 | Holt | 260—488J |
| 2,715,121 | 8/1955 | Glen et al. | 260—209 |
| 2,997,493 | 8/1961 | Huber | 260—410.6 |

LORRAINE A. WEINBERGER, Primary Examiner

R. S. WEISSBERG, Assistant Examiner

U.S. Cl. X.R.

260—248, 295.5, 469, 473, 485, 486, 488